(12) United States Patent
Tran et al.

(10) Patent No.: US 11,074,710 B2
(45) Date of Patent: Jul. 27, 2021

(54) IMAGE-BASED FRAMEWORK FOR IMPROVING LOCATION ESTIMATE ACCURACY IN INDOOR POSITIONING SYSTEMS

(71) Applicant: Cisco Technology, Inc., San Jose, CA (US)

(72) Inventors: Huy Phuong Tran, Milpitas, CA (US); Xu Zhang, Fremont, CA (US); Santosh Ghanshyam Pandey, Fremont, CA (US); Hugo Latapie, Long Beach, CA (US); Abhishek Mukherji, Fremont, CA (US); Enzo Fenoglio, Issy-les-Moulineaux (FR)

(73) Assignee: Cisco Technology, Inc., San Jose, CA (US)

( * ) Notice: Subject to any disclaimer, the term of this patent is extended or adjusted under 35 U.S.C. 154(b) by 28 days.

(21) Appl. No.: 16/724,751

(22) Filed: Dec. 23, 2019

(65) Prior Publication Data

US 2021/0192768 A1    Jun. 24, 2021

(51) Int. Cl.
*G06T 7/70* (2017.01)
*G06K 9/46* (2006.01)
*G01S 5/02* (2010.01)
*H04W 4/33* (2018.01)

(52) U.S. Cl.
CPC .............. *G06T 7/70* (2017.01); *G01S 5/0257* (2013.01); *G06K 9/4647* (2013.01); *H04W 4/33* (2018.02); *G06T 2207/20081* (2013.01); *G06T 2207/30241* (2013.01)

(58) Field of Classification Search
CPC ......... G06T 7/70; G06K 9/4647; H04W 4/33; G01S 5/0257
USPC ....................................................... 382/103
See application file for complete search history.

(56) References Cited

U.S. PATENT DOCUMENTS

| 9,693,194 B2 | 6/2017 | Pandey et al. |
| 10,254,380 B2 | 4/2019 | Tran et al. |
| 2020/0097718 A1* | 3/2020 | Schafer ................ G06K 9/6256 |
| 2020/0201018 A1* | 6/2020 | Vaziri ................ G06K 9/00147 |

OTHER PUBLICATIONS

Bernstein, D.et al., "An introduction to map matching for personal navigation assistants", Tech. rep., New Jersey TIDE Center, Newark, NJ, USA (1996).
Brakatsoulas, S.etal., "On map-matching vehicle tracking data", In: Proc. of the 31st Int. Conf. on Very Large Data Bases, pp. 853-864, VLDB Endowment, Trondheim, Norway (2005).
(Continued)

*Primary Examiner* — Ayodeji O Ayotunde
(74) *Attorney, Agent, or Firm* — Behmke Innovation Group LLC; James M. Behmke; Jonathon P. Western

(57) ABSTRACT

In one embodiment, a service obtains spatial information regarding a physical area. The service estimates locations of a device within the physical area over time, based on wireless signals sent by the device. The service generates a set of images based on the spatial information regarding the physical area and on the estimated locations of the device within the physical area over time. The service updates an estimated location of the device by inputting the generated set of images to a machine learning model trained to minimize a location estimation error.

20 Claims, 13 Drawing Sheets

(56) References Cited

OTHER PUBLICATIONS

Bronstein, M. et al., "Geometric deep learning: going beyond euclidean data", IEEE Signal Processing Magazine 34(4), 18-42 (2017).
Krumm, J. et al., "Map matching with travel time constraints", Tech. Rep. 2007-1-1102, SAE Technical Paper, Detroit, MI, USA (2007).
Mohamed, R.et al., "Accurate and ecient map matching for challenging environments" In: Proceedings of the 22nd ACM SIGSPATIAL International Conference on Advances in Geographic Information Systems, pp. 401-404, SIGSPATIAL '14, ACM, New York, NY, USA (2014), http://doi.acm.org/10.1145/2666310.2666429.
Newson, P.et al., "Hidden Markov map matching through noise and sparseness", In: Proc. of the 17th ACM SIGSPATIAL Int. Conf. on Advances in Geographic Information Systems, pp. 336-343. ACM, Seattle, WA, USA (2009).
Osogami, T. et al., "Map matching with inverse reinforcement learning" In: IJCAI (2013).
Quddus, M.A.et al., "A general map matching algorithm for transport telematics applications", J. GPS Solutions 7(3), 157-167 (2003).
Ranzato, M.et al., "Unsupervised learning of invariant feature hierarchies with applications to object recognition", In: 2007 IEEE Conference on Computer Vision and Pattern Recognition, pp. 1-8 (Jun. 2007).
Seitz, J.et al., "A Hidden Markov Model for urban navigation based on fingerprinting and pedestrian dead reckoning", In: Proc. of the 13th Int. Conf. on Information Fusion, pp. 1-8, IEEE, Edinburgh, UK (2010).
Tran, D.et al., "Learning spatiotemporal features with 3d convolutional networks", In: Proceedings of the 2015 IEEE International Conference on Computer Vision (ICCV), pp. 4489-4497. ICCV '15, IEEE Computer Society, Washington, DC, USA (2015), http://dx.doi.org/10.1109/ICCV.2015.510.
White, C.E.et al., "Some map matching algorithms for personal navigation assistants", J. Transportation Research Part C: Emerging Technologies 8(1), 91-108 (2000).
Xiong, J. et al., "ArrayTrack: A Fine-Grained Indoor Location System", USENIX Association, 10th USENIX Symposium on Networked Systems Design and Implementation (NSDI '13), pp. 71-84.
Kotaru, M. et al., "SpotFi: Decimeter Level Localization Using WiFi", SIGCOMM '15, Aug. 17-21, 2015, London, United Kingdom, pp. 269-282.

\* cited by examiner

IMAGE-BASED FRAMEWORK FOR IMPROVING LOCATION ESTIMATE ACCURACY IN INDOOR POSITIONING SYSTEMS

TECHNICAL FIELD

The present disclosure relates generally to computer networks, and, more particularly, to an image-based framework for improving location estimate accuracy in indoor positioning systems (IPSs).

BACKGROUND

Wireless networks are becoming increasingly ubiquitous, with many businesses, schools, and public areas now offering wireless connectivity to authorized users and to guests. With the increasing popularity of wireless networks, the number of different types of wireless nodes is also rapidly increasing. For example, personal devices now include cellular phones, tablets, wearable devices (e.g., smart watches, head-mounted displays, etc.), and the like, of various makes, models, and configurations. In addition, tracking tags are also becoming much more common, allowing the wireless network to track the objects to which the tags are attached.

In general, an infrastructure-based indoor positioning system (IPS) processes the radio frequency (RF) signals received at the access points (APs) in the wireless network, to estimate the locations of the various wireless nodes in the network. While modern IPSs are capable of estimating the location of devices to within a certain degree of accuracy, typically on the order of several meters, this is still not sufficient for certain applications. For example, in an emergency situation, the difference of several meters can mean the difference between a person being in a hazardous location and a safe location.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
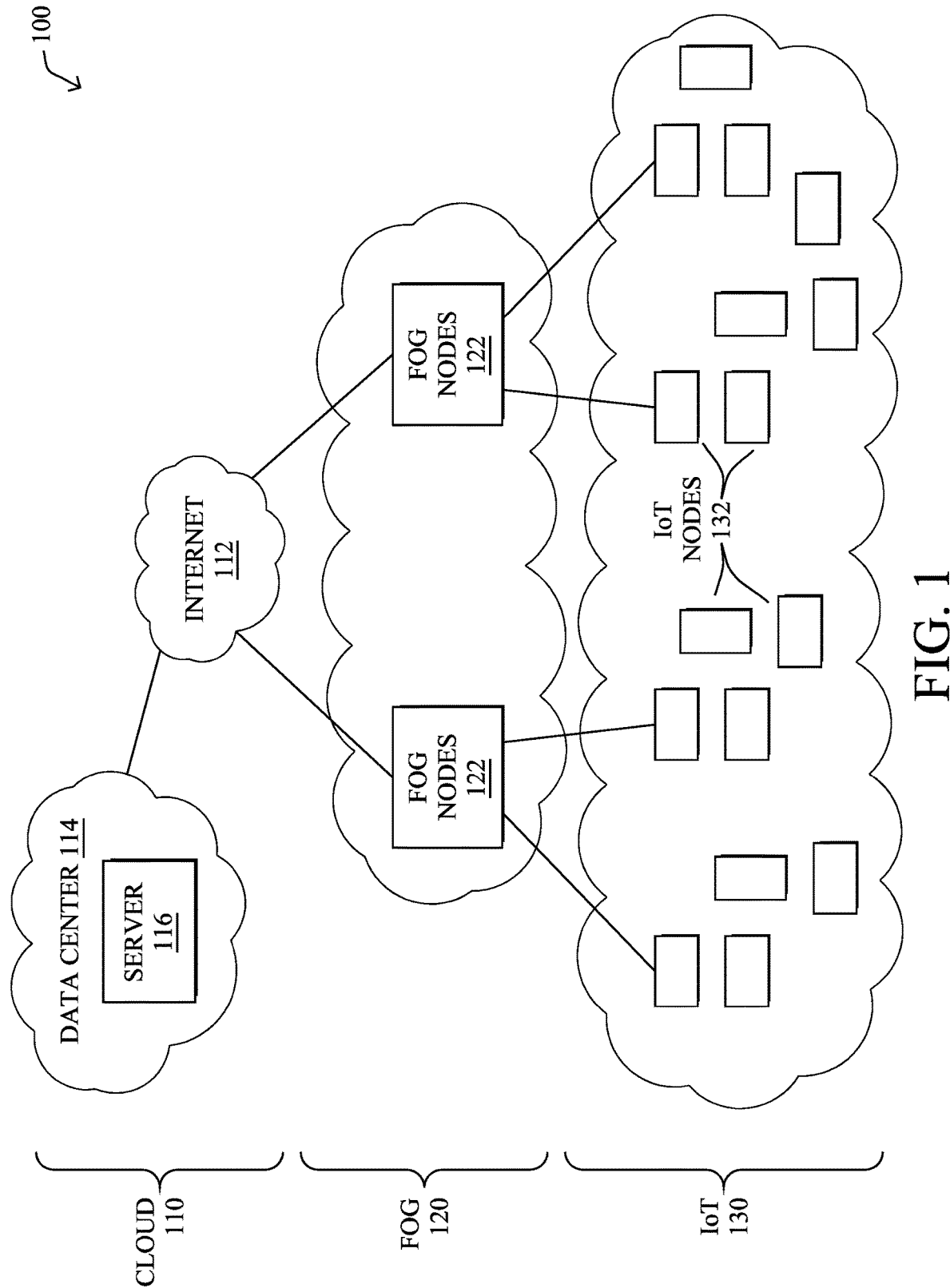
FIG. 1 illustrate an example network.

According to one or more embodiments of the disclosure, a service obtains spatial information regarding a physical area. The service estimates locations of a device within the physical area over time, based on wireless signals sent by the device. The service generates a set of images based on the spatial information regarding the physical area and on the estimated locations of the device within the physical area over time. The service updates an estimated location of the device by inputting the generated set of images to a machine learning model trained to minimize a location estimation error.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, fog layer 120, and IoT device layer 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. For example, fog nodes/devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
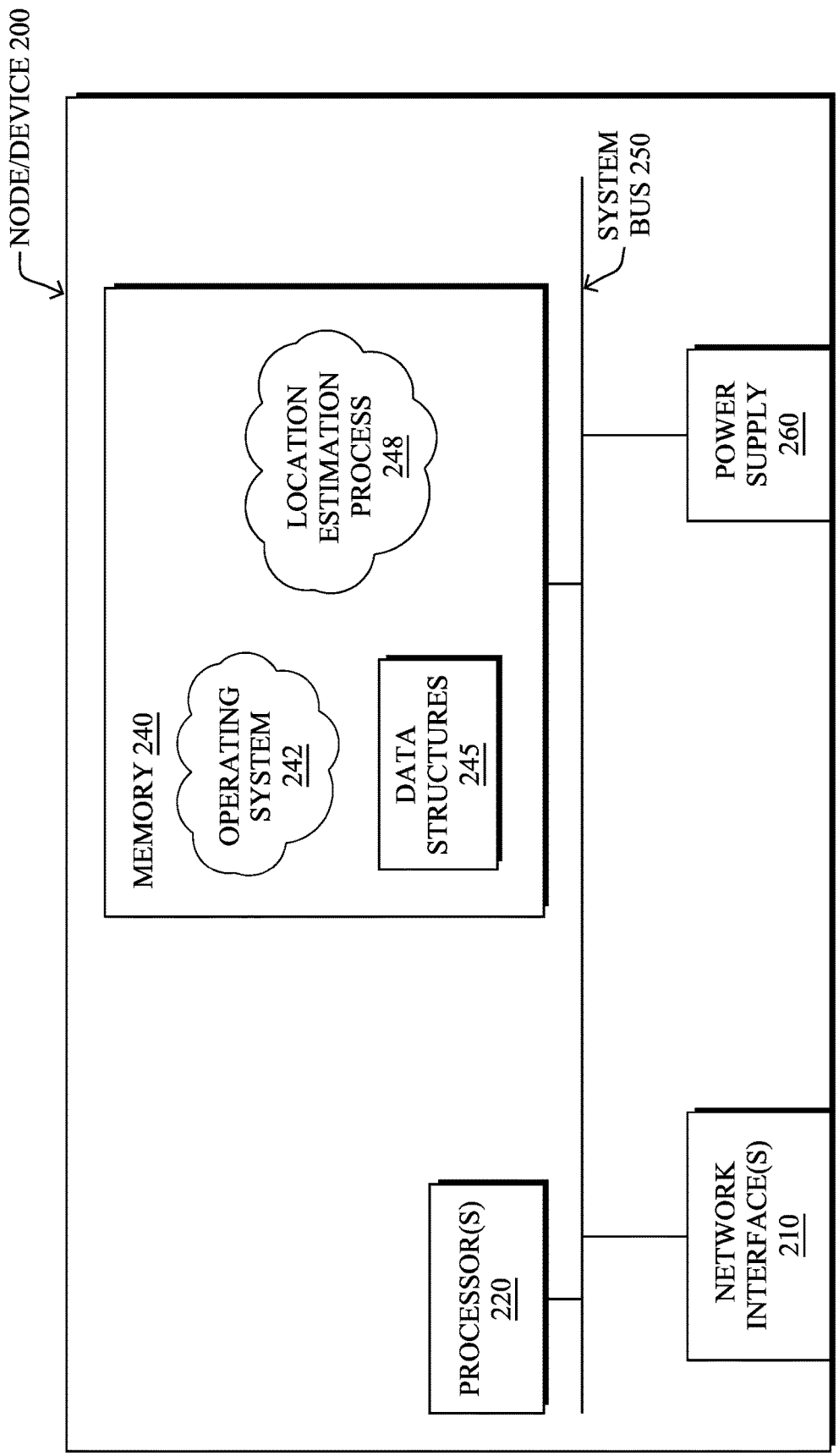
FIG. 2 illustrates an example network device/node.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative movement analysis process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In various embodiments, location estimation process 248 may utilize machine learning techniques, to monitor, analyze, and predict the locations of wireless devices in a network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of monitoring, analyzing, and predicting the locations of devices in a wireless network, a learning machine may construct a model of the observed behavior of a given wireless. Example machine learning techniques that may be used to construct such a model may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like. Accordingly, location estimation process 248 may employ deep learning, in some embodiments. Generally, deep learning is a subset of machine learning that employs ANNs with multiple layers, with a given layer extracting features or transforming the outputs of the prior layer.

One class of machine learning techniques that is of particular use in the context of monitoring, analyzing, and predicting node behavior in a wireless network is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DBSCAN) and mean-shift, where a distance to a cluster is computed with the hope of reflecting a degree of similarity (e.g., using a Euclidian distance and a cluster based local outlier factor that takes into account the cluster density). More specifically, in some embodiments, behavioral data for clients of the same type can be clustered and used to train a behavioral model for that type of client.

Replicator techniques may also be used for purposes of monitoring, analyzing, and predicting node behavior in a wireless network. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

Figure 3:
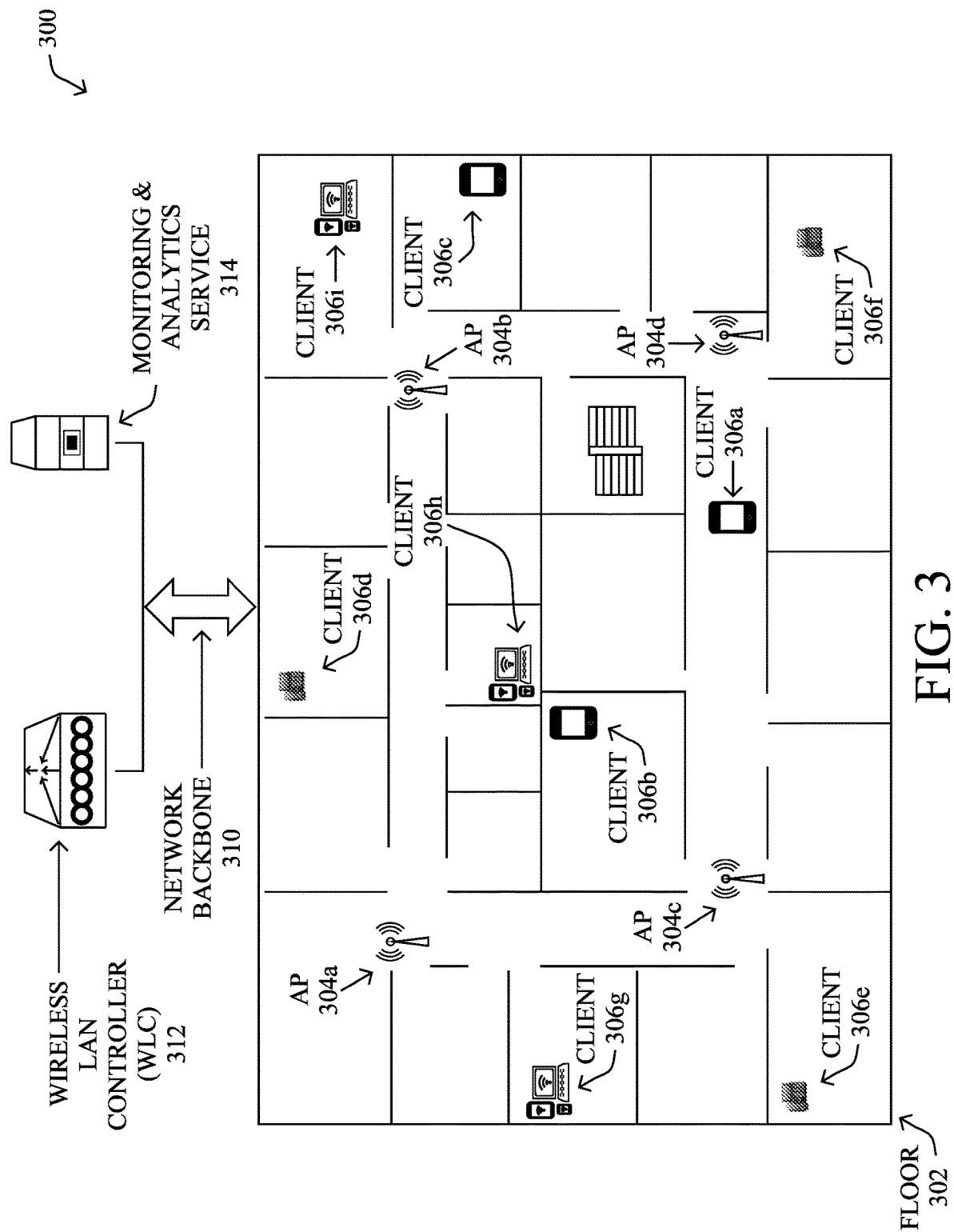
FIG. 3 illustrates an example wireless network.

FIG. 3 illustrates an example wireless network 300, according to various embodiments. Wireless network 300 may be deployed to a physical area, such as floor 302 shown, and may include various infrastructure devices. These infrastructure devices may include, for example, one or more access points (APs) 304 that provide wireless connectivity to the various wireless nodes 306 distributed throughout the location. For illustrative purposes, APs 304a-304d and clients 306a-306i are depicted in FIG. 3. However, as would be appreciated, a wireless network deployment may include any number of APs and wireless nodes.

A network backbone 310 may interconnect APs 304 and provide a connection between APs 304 and any number of supervisory devices or services that provide control over APs 304. For example, as shown, a wireless LAN controller (WLC) 312 may control some or all of APs 304a-404d, by setting their control parameters (e.g., max number of attached clients, channels used, wireless modes, etc.). Another supervisory service that oversees wireless network 300 may be a monitoring and analytics service 314 that measures and monitors the performance of wireless network 300 and, if so configured, may also adjust the operation of wireless network 300 based on the monitored performance (e.g., via WLC 312, etc.).

In various embodiments, monitoring and analytics service 314 may also include an indoor positioning system (IPS) configured to compute location estimates for the various wireless nodes 306 within wireless network 300. For example, the location of a given wireless node 306 can be estimated via analysis of the received signal strength indicator (RSSI) information, angle of arrival (AoA), information, and/or other RF data regarding the node 306 collected by one or more of APs 304.

Network backbone 310 may further provide connectivity between the infrastructure of the local network and a larger network, such as the Internet, a Multiprotocol Label Switching (MPLS) network, or the like. Accordingly, WLC 312 and/or monitoring and analytics service 314 may be located on the same local network as APs 304 or, alternatively, may be located remotely, such as in a remote datacenter, in the cloud, etc. To provide such connectivity, network backbone 310 may include any number of wired connections (e.g., Ethernet, optical, etc.) and/or wireless connections (e.g., cellular, etc.), as well as any number of networking devices (e.g., routers, switches, etc.).

The types and configurations of nodes 304 in network 300 can vary greatly. For example, nodes 306a-306c may be mobile phones, nodes 306d-306f may be office phones, and nodes 306g-306i may be computers, all of which may be of different makes, models, and/or configurations (e.g., firmware or software versions, chipsets, etc.). Other forms of wireless nodes in a network may also include radio frequency (RF) tracking tags. Consequently, each of nodes 306a-306i may behave very differently in wireless network 300 from both RF and traffic perspectives.

As noted above, IPS functionality typically entails assessing the characteristics of radio frequency (RF) signals received by the various clients 306 in a network, such as wireless network 300, to estimate their locations within the physical area in which network 300 is deployed. For example, monitoring and analytics service 314 may evaluate the signal strength indicators (RSSIs), angles of arrival (AoAs), etc. of signals received by APs 304 from the various clients 306 in network 300, to estimate the locations of clients 306. By applying techniques such as triangulation to the received signals, service 314 can estimate the locations of the clients.

While existing IPS approaches provide some degree of accuracy, there is still a certain degree of uncertainty in every location estimate from an IPS. Indeed, the actual location of a device can vary from its estimated location on the order of several yards or meters.

Image-Based Framework for Improving Location Estimate Accuracy in IPSs

The techniques herein introduce an image-based framework for improving location estimate accuracy in indoor positioning systems (IPSs). In some aspects, temporal information (e.g., a trajectory of location estimates) and spatial information (e.g., a floor plan, a convex-hull, Wi-Fi coverage, etc.) are converted into 2-Dimensional (2-D) images. In turn, image analysis leveraging deep learning is applied to the images, to improve the location and tracking estimates.

Specifically, according to one or more embodiments of the disclosure as described in detail below, a service obtains spatial information regarding a physical area. The service estimates locations of a device within the physical area over time, based on wireless signals sent by the device. The service generates a set of images based on the spatial information regarding the physical area and on the estimated locations of the device within the physical area over time. The service updates an estimated location of the device by inputting the generated set of images to a machine learning model trained to minimize a location estimation error.

Illustratively, the techniques described herein may be performed by hardware, software, and/or firmware, such as in accordance with the location estimation process 248, which may include computer executable instructions executed by the processor 220 (or independent processor of interfaces 210) to perform functions relating to the techniques described herein, e.g., to provide an indoor positioning system/service (IPS) to a network.

Figure 4:
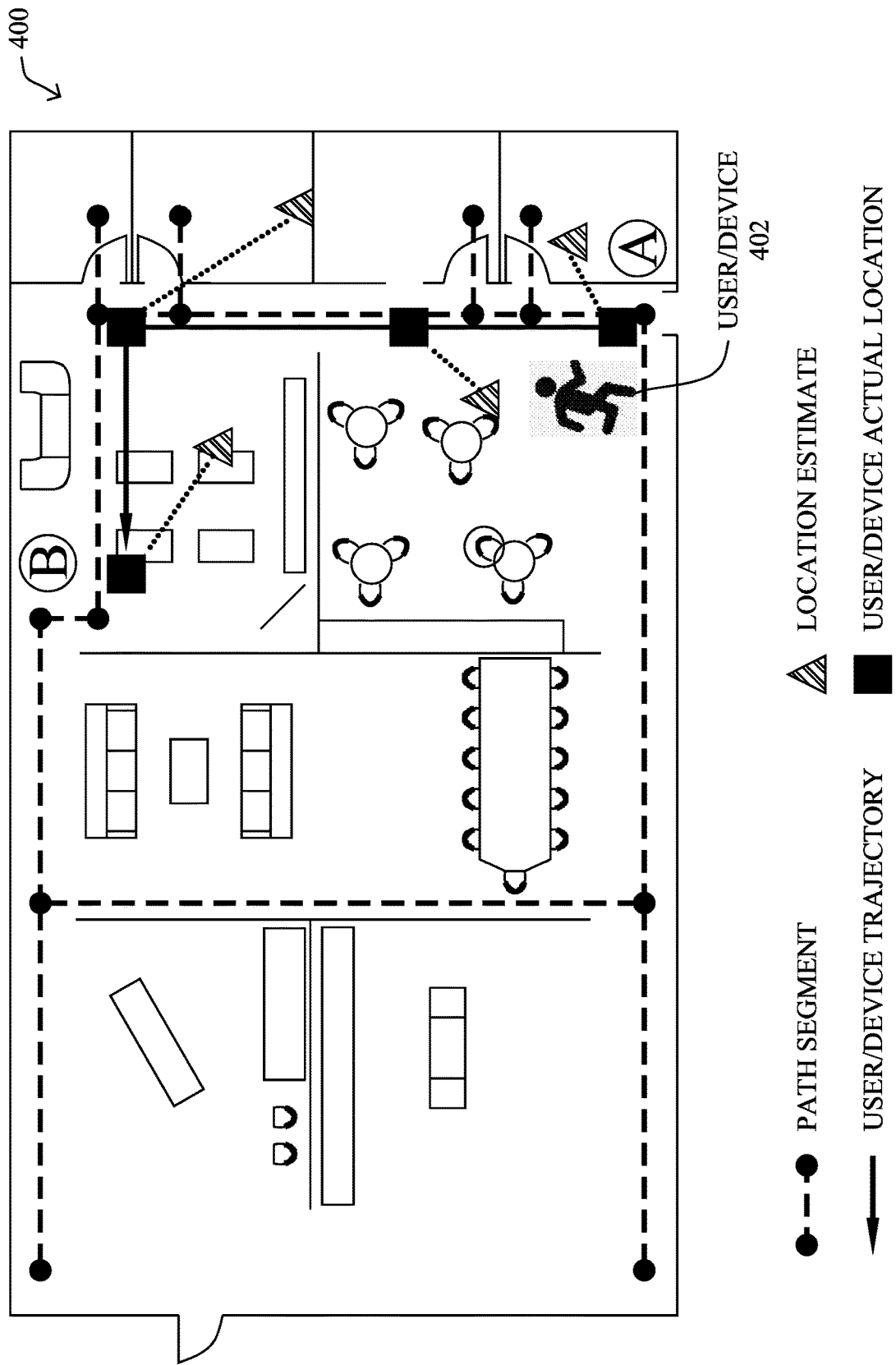
FIG. 4 illustrates an example floor map.

Operationally, FIG. 4 illustrates an example floor map 400 showing the movement of a user/device 402 over time. As shown, assume that a user and, more specifically, a device transported by the user, moves throughout the physical area depicted by floor map 400. To help explain the techniques herein, the following definitions are introduced, with reference to FIG. 4:

A path segment is a straight line connecting two locations on a floor map. It has no intersection with other path segments, except at its ends.

A location estimate $r_i$ at time step $t_i$ is the pair of coordinates on a two-dimensional (2-D) floor map. For example, as the user/device 402 travels throughout the physical area, the IPS may estimate the location of user/device 402 based on the wireless signals (e.g., RSSI, AoA, etc.) sent received by the wireless network from the device.

A trajectory $TR_n$ at the current time step $t_n$ is a sequence of location estimates $r_i$ until $t_n$:

$$TR_n = \{r_1, \ldots, r_i, \ldots, r_n\}$$

From a computational standpoint, the challenge is to constrain the current location estimate $r_n$ on the path taken by the user/device, given the floor map and trajectory $TR_n$ until the current time step $t_n$ and close to the current location of the user/device. For example, as shown in FIG. 4, assume that the user/device 402 is traveling from point A to point B in the physical area. In such a case, the challenge is to constrain the location estimates for user/device 402 to the path segments shown and close to the current location of user/device 402.

Figure 5:
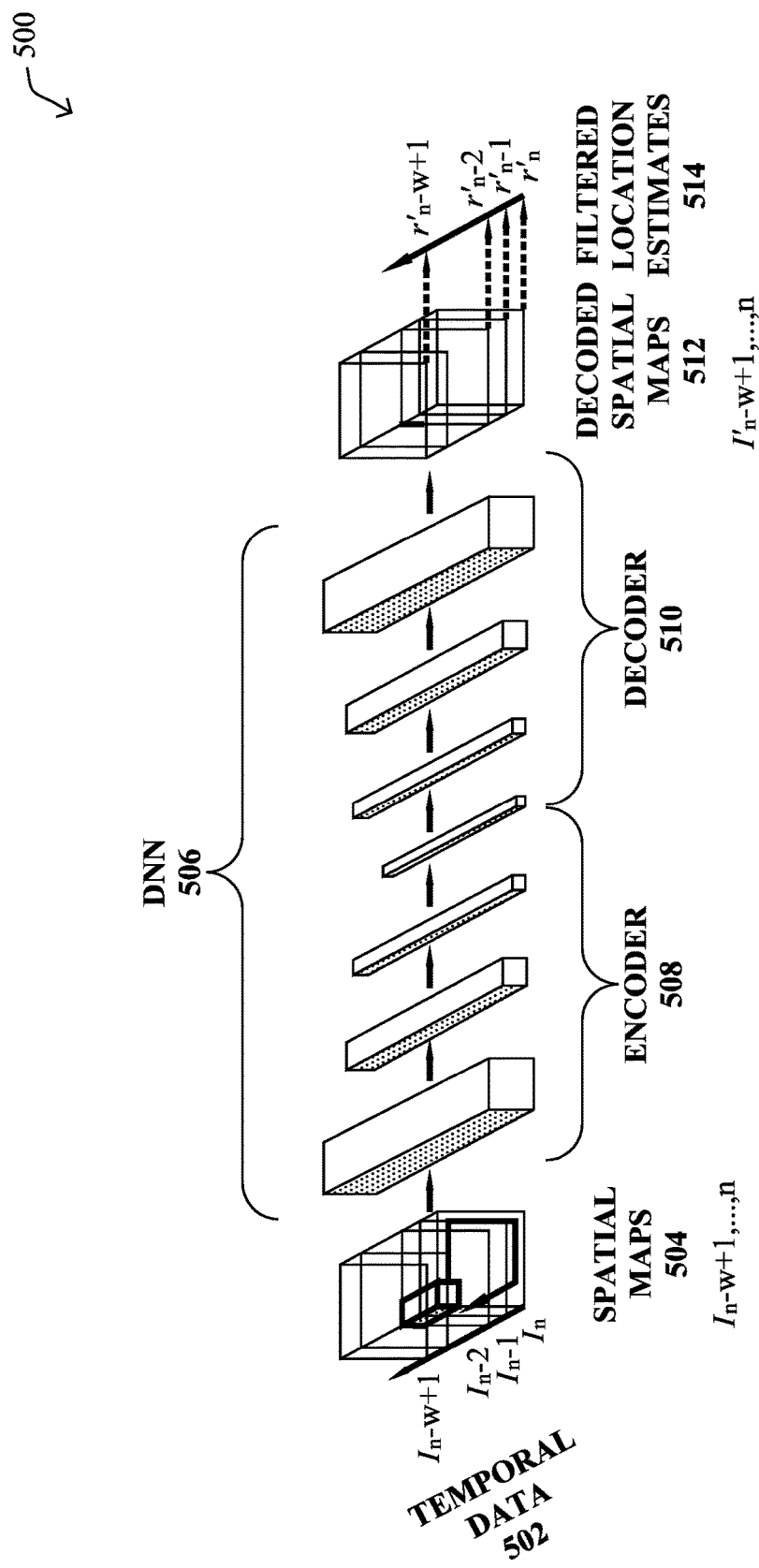
FIG. 5 illustrates an example machine learning model for refining location estimates.

According to various embodiments, FIG. 5 illustrates an example machine learning model 500 for refining location estimates, according to various embodiments. For example, location estimation process 248 may use model 500 to improve its location estimates for a device located in a physical area, such as part of an IPS or other location-determining service. A key observation is that a machine learning model may be trained to improve location estimates by leveraging spatial information regarding the physical area itself.

In one embodiment, as shown, machine learning model 500 may take the form of a three-dimensional (3-D) convolutional deep neural network (DNN) 506. During use, DNN 506 takes as input a combination of temporal data 502 (e.g., the estimated device locations over time) and spatial maps 504 regarding the physical area. More specifically, DNN 506 may take as input $I_{n-w+1}, \ldots, _n$, a window of w spatial maps $I_{n-w+1}, \ldots, I_n$ from time steps $t_{n-w+1}, \ldots, t_w$, and output a corresponding decoded spatial maps $I_{n-w+1}^l, \ldots, n^l$. These decoded maps 512 can then be converted to the filtered location estimates 514, denoted $r_{n-w+1}1^l, \ldots, r_n^l$. This allows the executing process to align $r_n^l$ on the nearest path segment.

As shown, model 500 may generally comprise an encoder 508 and a decoder 510. Encoder 508 may, for example, comprise four components whereby each component has a 3D Convolution Neural network (3D-CNN) layer with a ReLU activation function followed by a 3D Max-Pooling layer. Different from 2-D versions of these layers, the 3-D versions convolve the information in a spatial domain and then in a temporal domain to learn spatio-temporal features from consecutive video frames. This allows the network to take into account the nature of the input data, which is a sequence of location estimates in the temporal domain.

Similarly, decoder 510 may also comprise four components whereby each component performs up-convolution and ReLU activation. Its final output is a stack of decoded spatial maps having the same dimensions as the input data. The decoded maps 512 are then used to compute the filtered location estimates 514.

As would be appreciated, any number of different implementations for machine learning model 500 are possible. For example, the number of 3-D convolutional layers and Max-Pooling layers can be varied. Said differently, the structure of the machine learning model and the hyperparameters tuning can be varied, to help the network deal with the sparseness of location estimates.

To demonstrate the efficacy of the techniques herein, a prototype machine learning model 500 was constructed where all convolution layers in DNN 506 used 3×3×3 (depth×height×width) kernels with stride=1. All Max-Pooling layers used 2×2×2 kernels except for the first two layers in the first two components, which used 1×2×2 kernels. The purpose of this was not to compress the spatial maps 504 in the temporal domain too early. In other words, the goal was to retain the spatial information at each step. The decoder 510 in the prototype consisted of the same number of components as the encoder 508, generating the decoded spatial maps 512. In turn, the sum of coordinates of all pixels in $I_n^l$ weighted by the pixel values to generate $r_n^l$ according to the following equation:

$$r'_n = \Sigma p_{value} * p_{coordinate} \text{ for } \forall p \in I'_n$$

Traditionally, location/positioning systems represent a set of predefined paths in the physical area as either a set of arcs or as a graph. In such cases, an arc consists of piecewise linear path segments, allowing geometric constraints to be established. Conversely, a graph consists of vertices and edges with each vertex presenting a coordinate on an endpoint of a path segment or arc. Each edge represents a path segment or arc. Given the graph representation, the topology of path segments or arcs can be further exploited to establish topological constraints.

In contrast to arc and graph-based approaches, the techniques herein instead represent the input data as images. Such a representation makes deep neural networks, such as convolutional neural networks (CNNs) well suited to understand and make inferences about the location, to improve the estimated locations of users/devices in the physical area.

According to various embodiments, the spatial information regarding the physical area in which the user/device is located may comprise any or all of the following:

A floor plan/map of the physical area—e.g., a map depicting hallways, doorways, rooms, etc.

An obstacle map of the physical area—e.g., a map depicting obstacles present in the area, such as desks, machinery, etc. In some cases, the obstacle map can be derived from the floor plan/map, as hallways, walls, etc. are themselves obstacles. In further embodiments, an obstacle map may also be dynamically generated based on further sensor inputs from the physical area. For example, one obstacle map may indicate areas of flooding due to a burst pipe, another obstacle map may indicate areas that are not passable due to overcrowding while a large event is occurring, etc. This information can be leveraged for purposes of determining the location estimation error associated with a location estimate. For example, if the service identifies that the estimated location of an object overlaps an existing obstacle, the service may adjust the corresponding estimation error (e.g., by increasing the error), so as to cause further location estimates to avoid the location of the obstacle.

A convex-hull map

A map of vicinal devices near the device under scrutiny

One or more Received Signal Strength Indicator (RSSI) heatmaps of the physical area (e.g., on a per AP-basis, etc.)

One or more Angle of Arrival (AoA) heatmap of the physical area (e.g., on a per AP-basis, etc.)

etc.

As used herein, 'spatial information regarding the physical area' can refer to any form of characteristic(s) of the physical area in which a user/device is located. While the above list represents those characteristics that are likely to be the most influential on the location estimates for the user/device, the techniques herein are not limited as such and also provide for the analysis of other forms of entered or sensed data regarding the area, as well. For example, other forms of spatial information that could also be used as part of the input for the machine learning model may include, but are not limited to, temperature measurements from the area, humidity measurements from the area, photo/light sensor measurements from the area, video or audio data captured from the area, or the like. Another key aspect of the techniques herein is that the image-based analysis can support multimodal sensors fusion, in various embodiments, allowing different types of spatial information to be used to improve location estimates, as desired.

Figure 6:
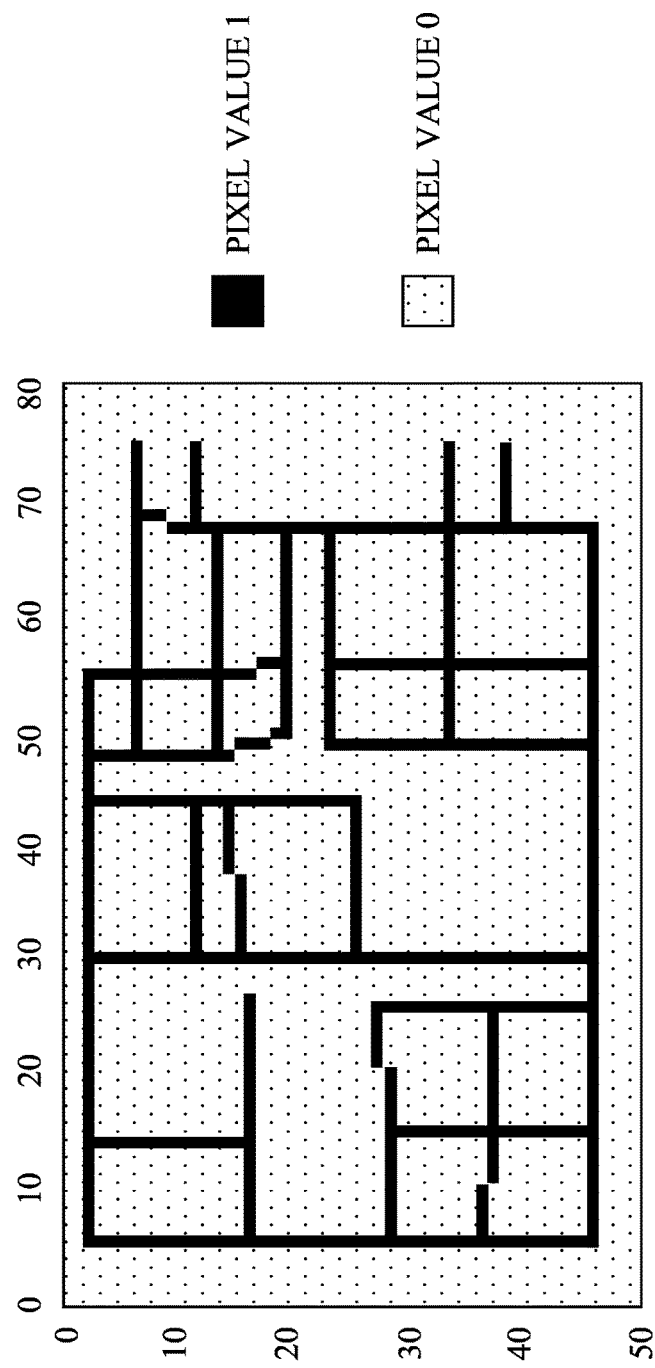
FIG. 6 illustrates an example image representing a floor map.

By way of simple example, assume that the spatial information on which the input to the machine learning model is based comprises a floor plan/map for the physical area. According to various embodiments, this spatial information can be represented in the form of a 2-D image. For example, FIG. 6 illustrates an example image 600 representing a floor map for a particular physical area. As shown, each pixel of image 600 may represent a specific portion of the physical area. For example, each pixel may correspond to a 1 foot by 1 foot area on the floor. This means that each pixel has an associated coordinate that represents a specific portion of the physical area. Typically, the top-left of the image will be assigned coordinate origin (0,0), although any other coordinate system may be used.

In some embodiments, each floor map image may designate a set of pre-defined path segments through the assignation of pixel values. For example, assume that all path segments for a physical area have the same width (e.g., 3 feet). If a given portion of the area corresponds to a path segment, its associated pixel in the image may be assigned a suitable pixel value, such as 1. Otherwise, the pixel value will be set to 0 or another suitable value. For example, in image 600, the pixels assigned a value of 1 are used to define the path segments for the physical area and the pixels assigned a value of 0 are used to define non-path regions of the physical area.

According to various embodiments, the machine learning model may also assess temporal information, to improve the location estimates for a user/device. In one embodiment, such temporal information may be captured through a series of location estimates for the user/device over time. For example, the IPS may estimate the location of the user/device in the physical area based on the wireless signals sent by the device using any existing estimation approach. For example, the IPS may make the initial location estimates based on the RSSIs, AoAs, times of arrival (ToAs), time difference of arrivals (TDOAs), or the like, of the wireless signals from the device being located.

Figure 7A:
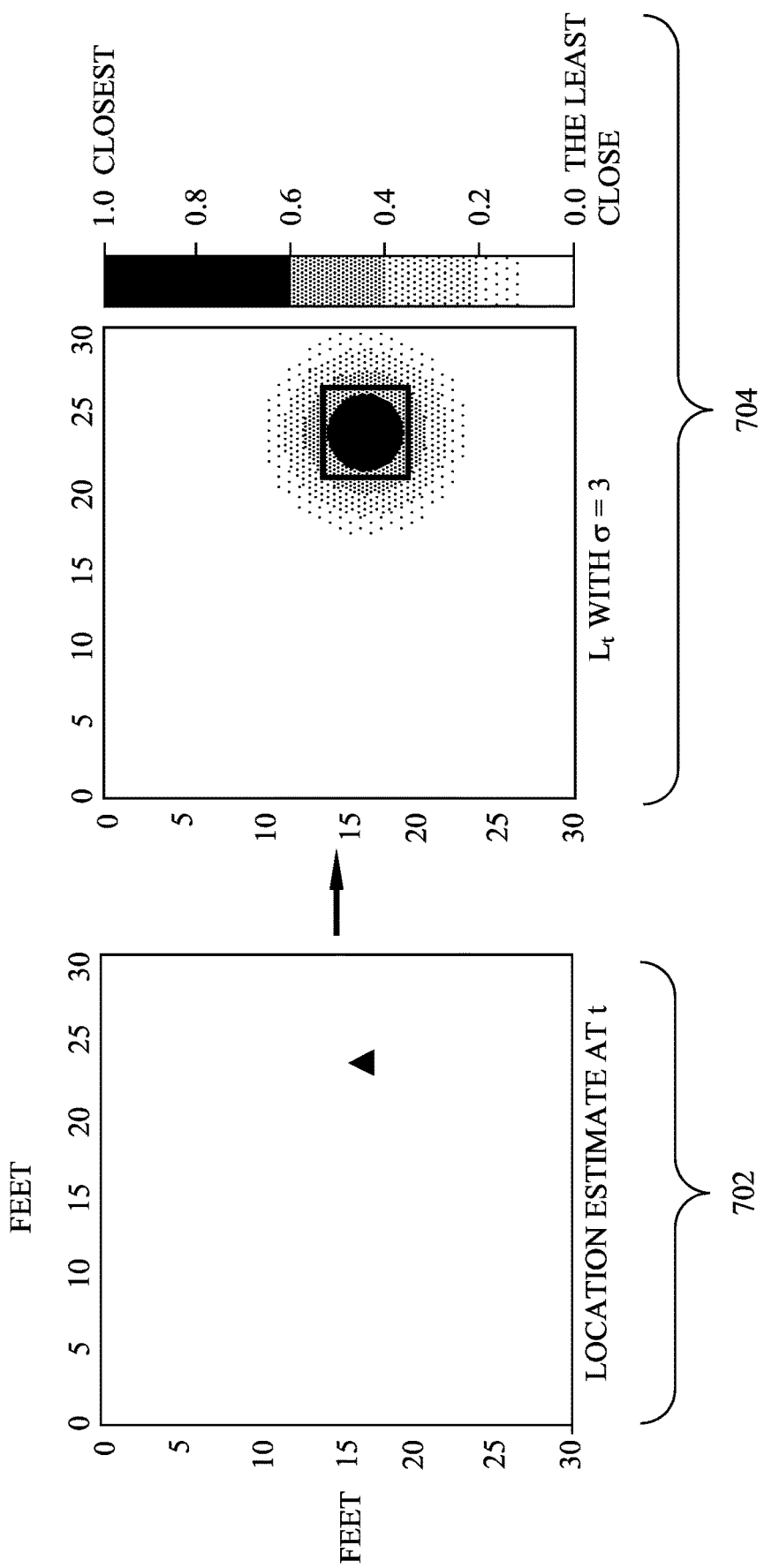
FIGS. 7A-7B illustrate an example of the conversion of a location estimate into an image.

In various embodiments, a location estimate for a device may be converted into image format for inclusion in the input to the machine learning model. For example, consider the case shown in FIG. 7A. As shown, assume that the IPS has made a location estimate 702 for a device and for a particular time t. The estimate may, for example, take the form of a coordinate relative to the physical area. To then represent the estimate as an image, the service may form an image having a comparable coordinate system and set the pixel values for the estimate, accordingly.

In some embodiments, the image representation of a location estimate may be made to also include measures of the device being at a particular location. For example, as shown, location estimate 702 may be represented as image 704 in which the pixel values represent the determined measure of the device being located at a particular location in the physical area. In other words, the pixel values may be assigned on a scale ranging from the least close location (e.g., a pixel value of 0.0) to closest (e.g., a pixel value of 1.0).

To also account for the location errors in the initial location estimates, the service may assign varying location measures to the generated image. For example, assume that the initial location estimation errors are carried out using a radial basis function (RBF) kernel. Those skilled in the art will recognize that the RBF kernel is also called as the Gaussian kernel and how the parameter $\sigma_l$ is a measure of the spread or deviation of the kernel that can be estimated from a training set of data. In turn, the initial location estimate for the user/device at a time t can be represented on an image $L_i$ having the same resolution as the images that represent the spatial information for the physical area (e.g., the floor map image, etc.). In one embodiment, this can be done for a location estimate $r_i$ as follows:

$$L_i = \exp\left(\frac{-d(p_{coordinate}, r_i)^2}{2\sigma_l^2}\right)$$

Figure 7B:
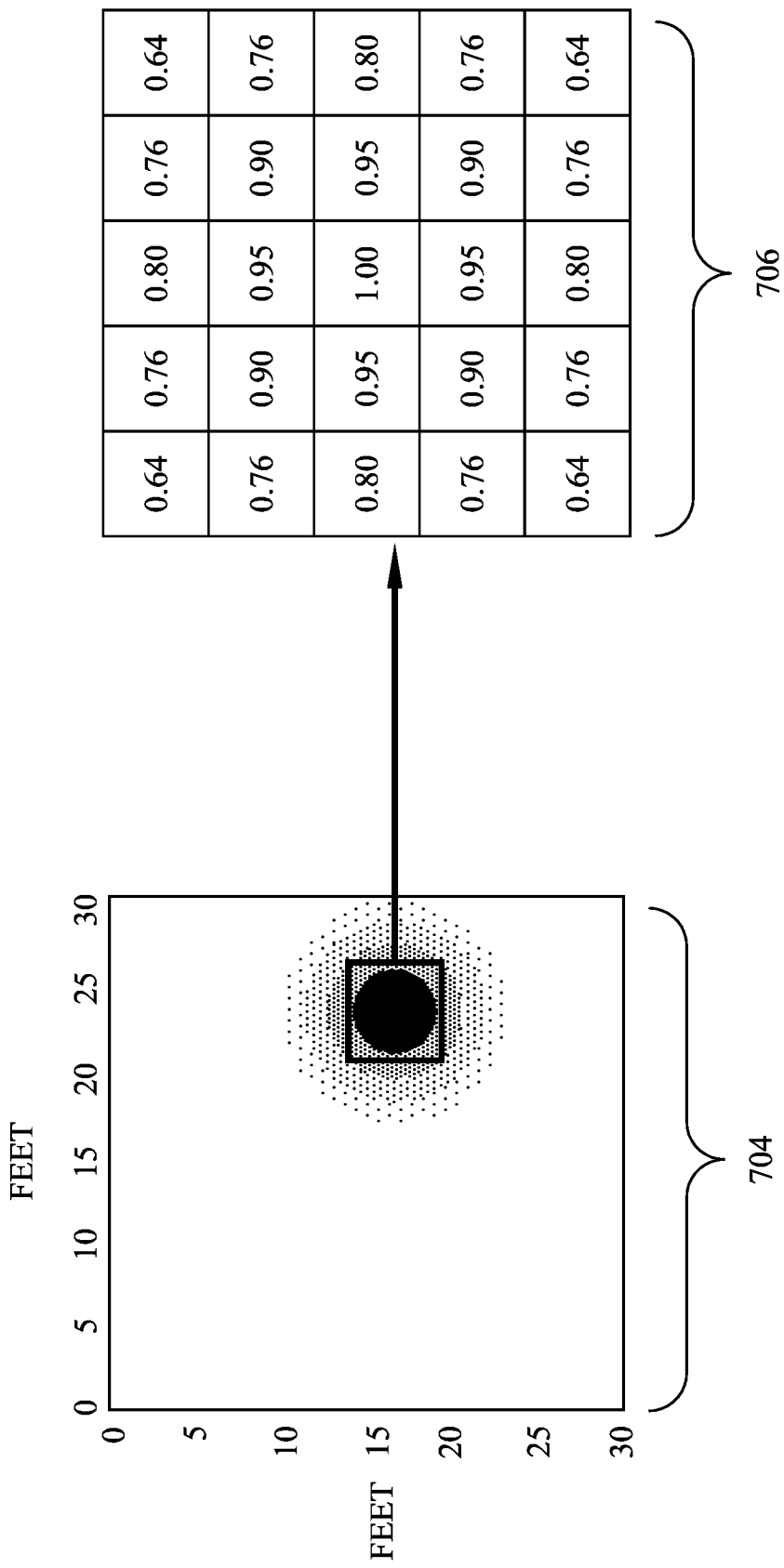

In the above equation, The RBF kernel represents a measure of similarity of closeness between location vectors as an exponential decaying function of the distance between the vectors $d(p, r_i)$, i.e., the Euclidean distance between each pixel p and the location estimate $r_i$. Similarly, $\sigma_l$ is the radius of influence of the samples selected by the model of the location estimation errors for the estimation approach used. For example, as shown in FIG. 7B, consider region 706 of image 704. Each pixel in region 706 will be assigned a pixel intensity that expresses a measure of similarity or closeness between location vectors of the user/device being located in the corresponding portion of the physical area at that time.

By converting the location closeness estimates for the user/device over a period of time, the service will now have a sequence of location images L1, . . . , Ln that indicate the estimated location measures over time. In turn, these images can be combined with the other images representing the spatial information for the physical area. For example, consider again the simplified case in which the spatial information takes the form of a single floor map image F. In such a case, the service may perform element-wise multiplication, to combine the spatial map image(s) with those of the location estimate images as follows:

$$I_i = F \odot L_i$$

where $I_i$ is the resulting image, F is the floor map image, and $L_i$ is the specific location image for a given time T=i.

Figure 8:
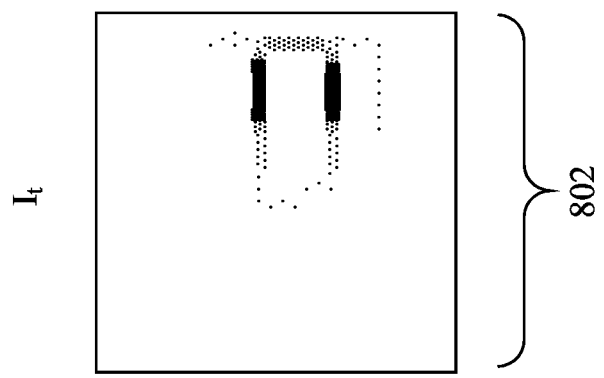
FIG. 8 illustrates an example of the combination of images for analysis by a machine learning model.
Figure 8:
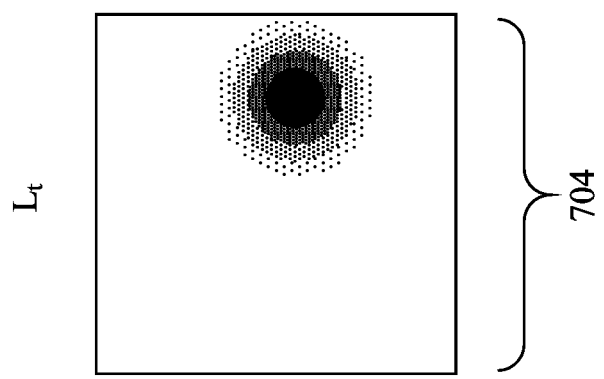
Figure 8:
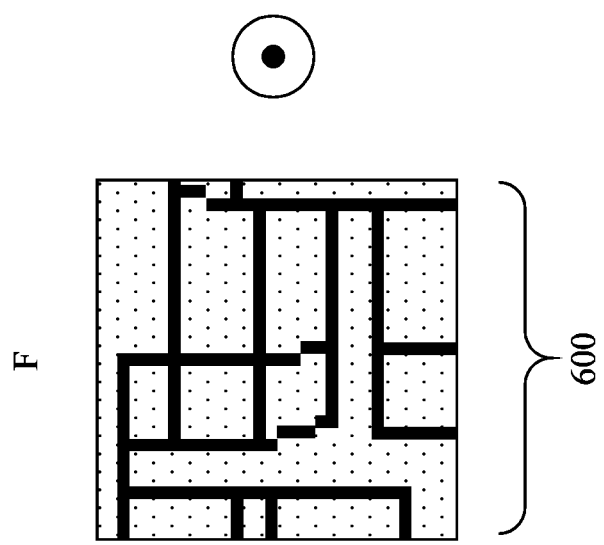

FIG. 8 illustrates an example of the combination of images for analysis by the machine learning model, in some embodiments. Continuing the examples of FIGS. 6 and 7A-7B, element-wise multiplication of images 600 and 704 result in a combined image 802 for input to the machine learning model. In this specific case, since the non-path pixels of image 600 have pixel values of 0, those pixels in image 802 will also have values of 0. Similarly, if the path segment pixels in image 600 have a value of 1, those pixels in image 802 will have pixel intensities equal to those in image 704. Thus, the non-zero pixel intensities in image 802 will still convey the closeness measures of the estimated location of the user/device under scrutiny.

Referring again to FIG. 5, training of machine learning model 500 can be achieved so as to minimize one or more loss functions, given an input set of images $I_{n-w+1}, \ldots, I_n$ to improve the initial location estimate for the current time step $t_n$.

In one embodiment, a loss function to minimize the location estimate error is as follows:

$$L(I'_{n-w+1,\ldots,n}; \theta) = \frac{1}{w} \sum_{i=n-w+1}^{n} d(r'_i, g_i)$$

where the left portion of the equation denotes the loss function in which $\theta$ denotes a set of parameters to be optimized. On the righthand side of the equation, an average of the location estimation errors is computed with each being the Euclidean distance between a filtered location estimate $r_i'$ and the corresponding actual location $g_i$ for $i \in [n-w+1, n]$. Thus, in this case, the filtered location estimate at time t is as follows:

$$r_i = \Sigma(\text{sigmoid}(\text{pixel value}) * \text{pixel coordinate})$$

As would be appreciated, other loss functions can also be used in combination with, or in lieu of, a loss function that seeks to minimize the location estimation error.

Training of machine learning model 500 may require a relatively large amount of training data. To this end, in some embodiments, synthetic training data can also be generated and used to train model 500. In other words, the training dataset for model 500 may comprise data that was not actually observed in the physical area. For example, such a training dataset may comprise multiple, simulated trajectories for users/devices, with each trajectory consisting of a sequence of location estimates and their corresponding actual locations on a floor plan. Two characteristics of real-world data can then be simulated: the sparseness of the location estimates and the scattering of the location estimates.

More specifically, in the simple case of the spatial information regarding the physical area comprising a floor plan/map, a trajectory of a user/device can be simulated by first picking two locations along one or more predefined path segments. From this, the shortest path between the two locations can be computed. To simulate the sparseness of the location estimates, the shortest path can be sampled at various distances s that follow a normal distribution $N(\mu_s, \sigma_s^2)$. For example, preliminary testing of the techniques herein was done by sampling the shortest path at one meter increments. To obtain the corresponding location estimates, 2-D Gaussian noises were added to actual locations. To simulate the scattering of location estimates, different values of $\sigma_l$ were used. In summary, given a floor map F, there are three parameters: $\mu_s$, $\sigma_s$, and $\sigma_l$ whose values can be changed, to form a synthetic training dataset denoted as $D_F(\mu_s, \sigma_s, \sigma_l)$.

To evaluate the efficacy of the techniques herein, two primary metrics were assessed for the prototype system: 1.) location accuracy, which represents the percentiles of location estimation errors (e.g., the Euclidean distances between aligned location estimates and the actual locations) and 2.) path-alignment accuracy, which represents how well the estimated locations align with actual path segments (e.g., whether the estimated locations align with hallways, walkways, etc.).

Figure 9A:
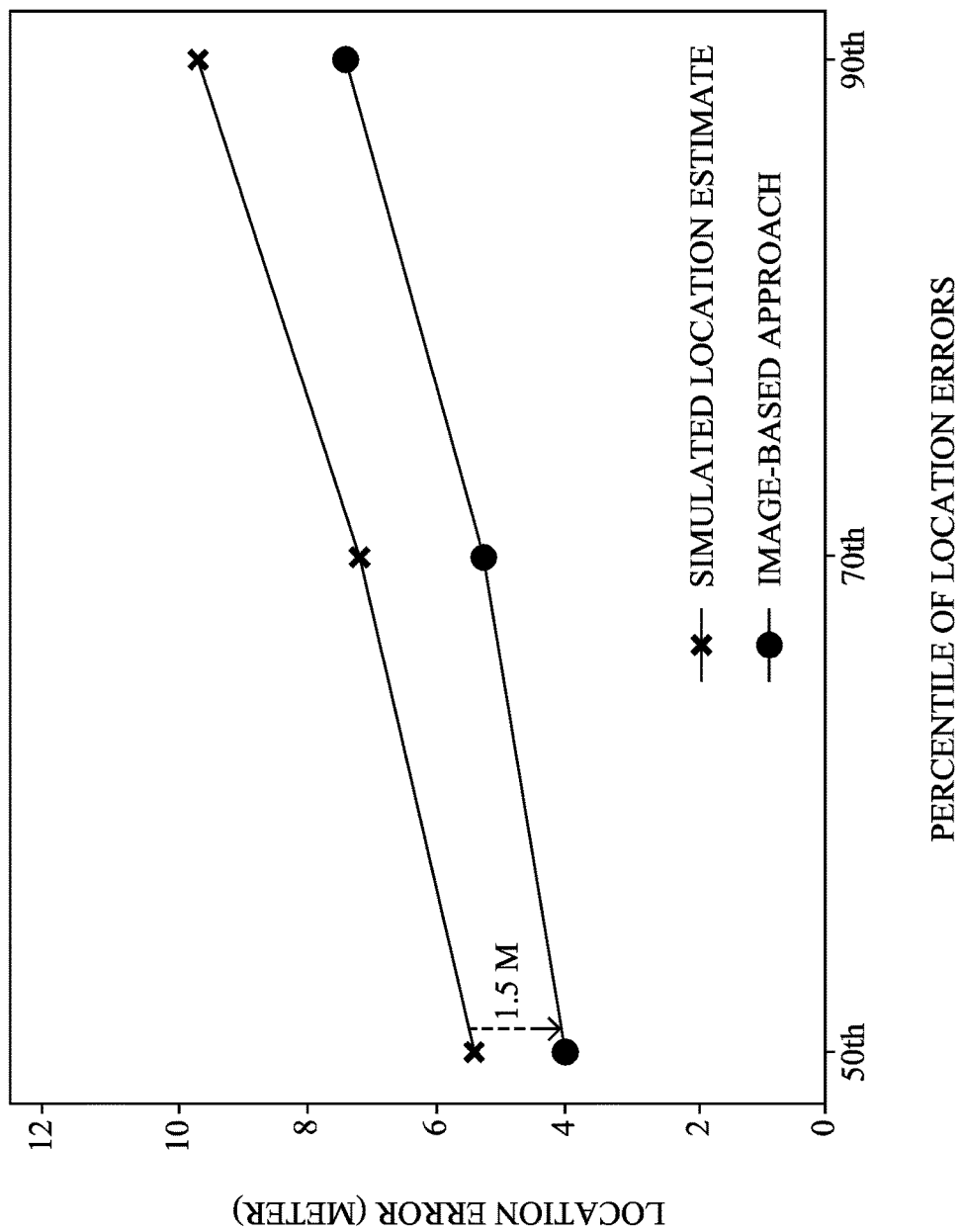
FIGS. 9A-9C illustrate example test results demonstrating the efficacy of the techniques herein.
Figure 9B:
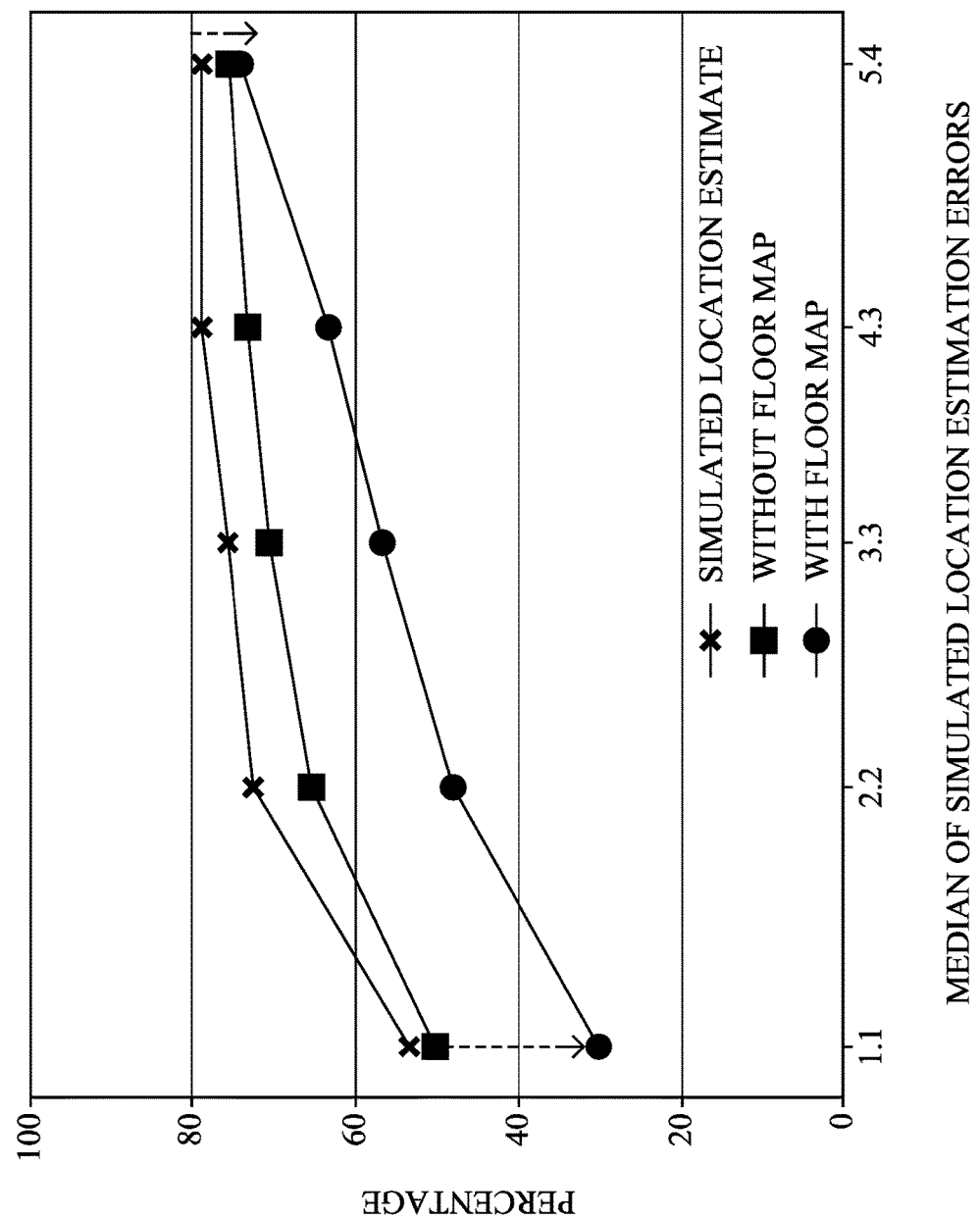
Figure 9C:
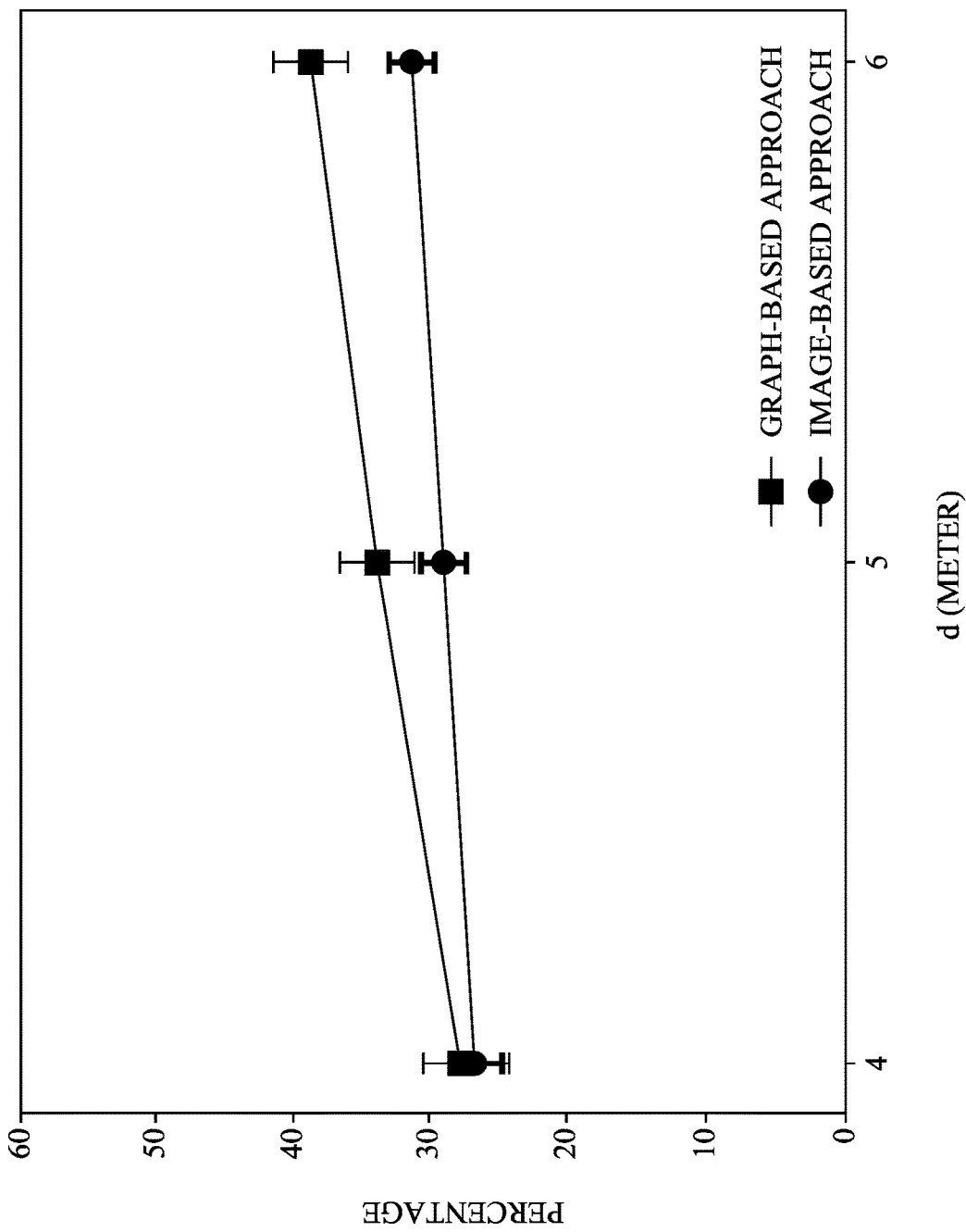

FIGS. 9A-9C illustrate example test results demonstrating the efficacy of the techniques herein, according to various embodiments. FIG. 9A illustrates a plot 900 of the location accuracies of a traditional location estimate approach and those resulting from a protype that uses the image-based techniques herein. More specifically, location estimates for users/devices were simulated using traditional approaches and compared to those estimates that were improved by the prototype system. From plot 900, it can be seen that the techniques herein decreased the location errors by 1.5 meters or more, which is a significant improvement over the traditional approach.

FIG. 9B illustrates a plot 910 comparing the results of simulated location estimates using a traditional, graph-based approach to the prototype system with and without the use of a floor map. As can be seen, the use of the image-based approach demonstrated lower estimation errors than that of the traditional approach. Moreover, use of a floor map as part of the spatial information for the image-based approach greatly decreased the location estimation errors.

FIG. 9C illustrates a plot 920 comparing the path alignment accuracies of the traditional, graph-based approach and the image-based approach introduced herein, again demonstrating the efficacy of the techniques herein. One thing to note is that the image-based approach does not strictly contain the location estimates on the path of the user/device, compared to the graph-based approach. This is because the average location errors were minimized during training of the machine learning model.

Figure 10:
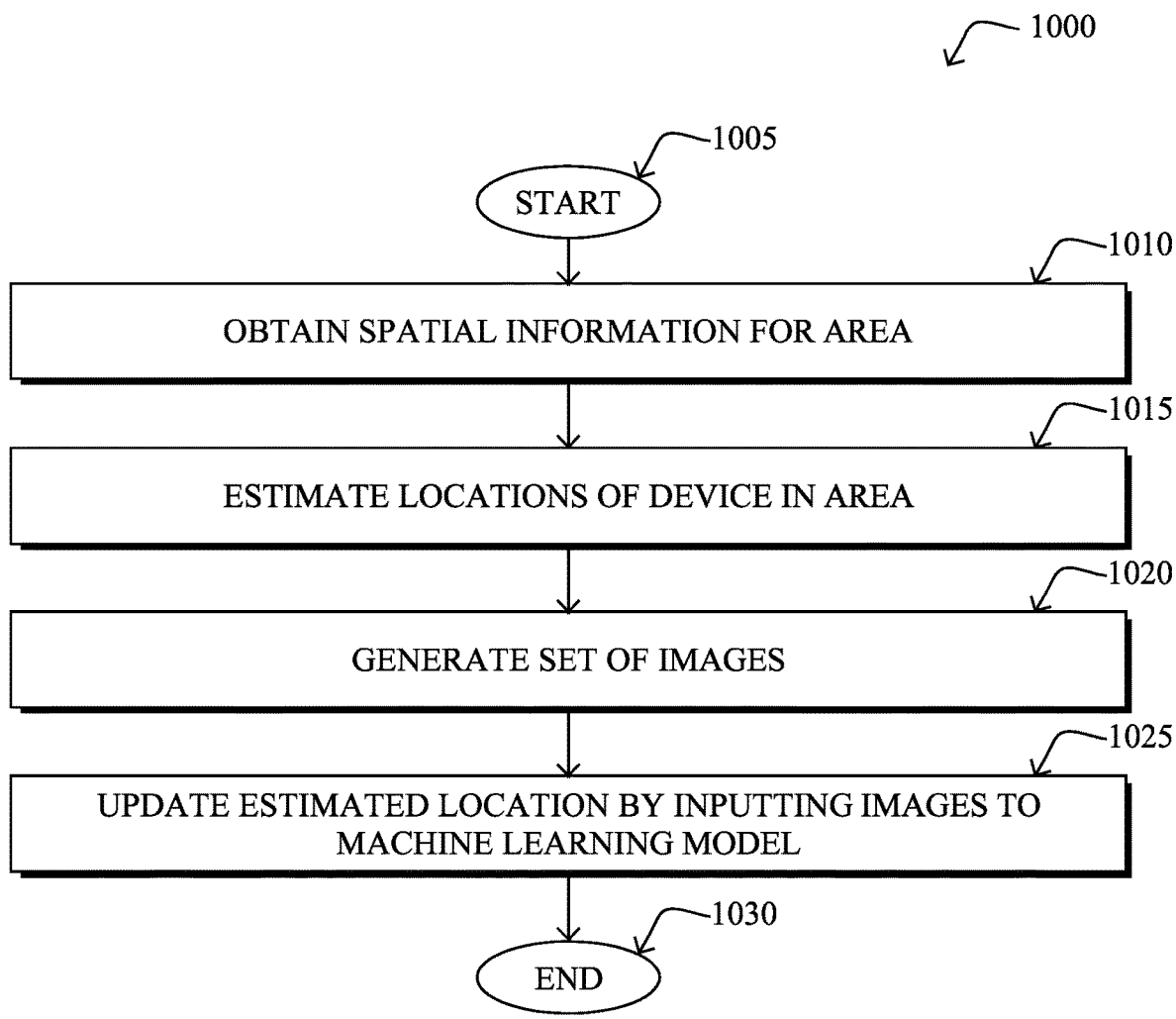
FIG. 10 illustrates an example simplified procedure for improving location estimate accuracy.

FIG. 10 illustrates an example simplified procedure for improving location estimate accuracy in a network in accordance with one or more embodiments described herein. For example, a non-generic, specifically configured device (e.g., device 200) may perform procedure 1000 by executing stored instructions (e.g., process 248), to provide a location estimation service to a network. The procedure 1000 may start at step 1005, and continues to step 1010, where, as described in greater detail above, the service may obtain spatial information regarding a physical area. For example, the service may receive the spatial information from a user interface (e.g., user-specified information) and/or from devices located in the area, such as deployed sensors. In various embodiments, the spatial information may be indicative of a floor plan or obstacle map for the area, an RSSI or AoA heatmap for the area, vicinal devices of a device to be located, a convex-hull map for the area, other data regarding the area, or combinations thereof.

At step 1015, as detailed above, the service may estimate locations of a device within the physical area over time, based on wireless signals sent by the device. For example, the service may estimate the locations of the device based on its RSSI values, AoA values, or the like.

At step 1020, the service may generate a set of images based on the spatial information regarding the physical area and on the estimated locations of the device within the physical area over time, as described in greater detail above. In other words, to improve the location estimate for a device, the service may convert information about the movement of the device, as well as spatial information for the physical area, into image data. For example, the resulting images may be 2-D images in which each pixel has a corresponding coordinate in the physical area.

At step 1025, as detailed above, the service may update an estimated location of the device by inputting the generated set of images to a machine learning model trained to minimize a location estimation error. In various embodiments, the model may be a convolutional autoencoder, such as a 3-D, deep learning neural network. Other suitable models can also be used. Such a model may, for example, filter the current location estimate for the device, thereby improving upon its accuracy. Procedure 1000 then ends at step 1030.

It should be noted that while certain steps within procedure 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, help to improve the accuracy of location estimates by an IPS or other location-estimating service. In some aspects, spatial information regarding the physical area can be used as input to a machine learning model, to help refine the location estimates.

While there have been shown and described illustrative embodiments that provide for the refinement of location estimates in a network, it is to be understood that various other adaptations and modifications may be made within the spirit and scope of the embodiments herein. For example, while certain embodiments are described herein with respect to using certain models for purposes of location estimation, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/

RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   obtaining, by a service, spatial information regarding a physical area;
   estimating, by the service, locations of a device within the physical area over time, based on wireless signals sent by the device;
   generating, by the service, a set of images based on the spatial information regarding the physical area and on the estimated locations of the device within the physical area over time; and
   updating, by the service, an estimated location of the device by inputting the generated set of images to a machine learning model trained to minimize a location estimation error.

2. The method as in claim 1, wherein the spatial information regarding the physical area is indicative of a floor plan or obstacle map of the physical area.

3. The method as in claim 1, wherein the locations of the device are estimated based on received signal strength indicator (RSSI) or angle of arrival (AoA) values associated with the wireless signals sent by the device.

4. The method as in claim 1, wherein the set of images generated based on the spatial information regarding the physical area and on the estimated locations of the device within the physical area over time comprise two-dimensional images.

5. The method as in claim 4, wherein the machine learning model comprises a three-dimensional convolutional autoencoder.

6. The method as in claim 1, wherein the set of images comprise one or more images in which pixel coordinates represent coordinates for the physical area and closeness measures of the location of the device are represented as pixel intensities.

7. The method as in claim 1, wherein the spatial information regarding the physical area is indicative of one or more of: a received signal strength indicator (RSSI) heatmap for the area or an angle of arrival (AoA) heatmap for the area.

8. The method as in claim 1, wherein the spatial information regarding the physical area is indicative of one or more of: a convex-hull map or one or more vicinal devices of the device.

9. The method as in claim 1, wherein the machine learning model minimizes the location estimation error in part by identifying location estimates of the device that overlap obstacles in the physical area.

10. An apparatus, comprising:
    one or more network interfaces to communicate with a wireless network;
    a processor coupled to the network interfaces and configured to execute one or more processes; and
    a memory configured to store a process executable by the processor, the process when executed configured to:
    obtain spatial information regarding a physical area;
    estimate locations of a device within the physical area over time, based on wireless signals sent by the device;
    generate a set of images based on the spatial information regarding the physical area and on the estimated locations of the device within the physical area over time; and
    update an estimated location of the device by inputting the generated set of images to a machine learning model trained to minimize a location estimation error.

11. The apparatus as in claim 10, wherein the spatial information regarding the physical area is indicative of a floor plan or obstacle map of the physical area.

12. The apparatus as in claim 10, wherein the locations of the device are estimated based on received signal strength indicator (RSSI) or angle of arrival (AoA) values associated with the wireless signals sent by the device.

13. The apparatus as in claim 10, wherein the set of images generated based on the spatial information regarding the physical area and on the estimated locations of the device within the physical area over time comprise two-dimensional images.

14. The apparatus as in claim 13, wherein the machine learning model comprises a three-dimensional convolutional autoencoder.

15. The apparatus as in claim 10, wherein the set of images comprise one or more images in which pixel coordinates represent coordinates for the physical area and closeness measures of the location of the device are represented as pixel intensities.

16. The apparatus as in claim 10, wherein the spatial information regarding the physical area is indicative of one or more of: a received signal strength indicator (RSSI) heatmap for the area or an angle of arrival (AoA) heatmap for the area.

17. The apparatus as in claim 10, wherein the spatial information regarding the physical area is indicative of one or more of: a convex-hull map or one or more vicinal devices of the device.

18. The apparatus as in claim 10, wherein the machine learning model was trained using a training dataset that comprised synthetic training data.

19. A tangible, non-transitory, computer-readable medium storing program instructions that cause a service to execute a process comprising:
    obtaining, by the service, spatial information regarding a physical area;
    estimating, by the service, locations of a device within the physical area over time, based on wireless signals sent by the device;
    generating, by the service, a set of images based on the spatial information regarding the physical area and on the estimated locations of the device within the physical area over time; and
    updating, by the service, an estimated location of the device by inputting the generated set of images to a machine learning model trained to minimize a location estimation error.

20. The computer-readable medium as in claim 19, wherein the spatial information regarding the physical area is indicative of a floor plan or obstacle map of the physical area.

* * * * *

UNITED STATES PATENT AND TRADEMARK OFFICE
CERTIFICATE OF CORRECTION

PATENT NO. : 11,074,710 B2
APPLICATION NO. : 16/724751
DATED : July 27, 2021
INVENTOR(S) : Huy Phuong Tran Page 1 of 1

It is certified that error appears in the above-identified patent and that said Letters Patent is hereby corrected as shown below:

In the Specification

Column 9, Lines 2-3, please amend as shown:

and output a corresponding decoded spatial maps $l'_{n-w+1}, \ldots, n'$. These decoded maps 512 can then be converted Column 9, Line 4, please amend as shown:

to the filtered location estimates 514, denoted $r'_{n-w+1}, \ldots,$

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*